United States Patent [19]

D'Aleo et al.

[11] Patent Number: 4,695,820

[45] Date of Patent: Sep. 22, 1987

[54] SAFETY DEVICE FOR APPARATUS HAVING RELATIVELY MOVABLE MEMBERS

[75] Inventors: Michael J. D'Aleo, Ottsville; Mark Smaich, Allentown, both of Pa.

[73] Assignee: Lutron Electronics Co. Inc., Coopersburg, Pa.

[21] Appl. No.: 839,303

[22] Filed: Mar. 13, 1986

[51] Int. Cl.[4] ............................................. H01C 10/38
[52] U.S. Cl. .................................... 338/179; 338/176; 338/198; 338/199; 338/200
[58] Field of Search ............... 338/179, 172, 198, 199, 338/200, 176; 315/291; 323/324; 200/307

[56] References Cited

U.S. PATENT DOCUMENTS

| | | | |
|---|---|---|---|
| 3,746,923 | 7/1973 | Spira et al. | 315/291 |
| 4,085,399 | 4/1978 | Wall | 338/200 |
| 4,104,606 | 8/1978 | DeWitt | 338/198 X |
| 4,117,445 | 9/1978 | Forman et al. | 338/172 X |
| 4,520,306 | 5/1985 | Kirby | 338/172 X |

Primary Examiner—E. A. Goldberg
Assistant Examiner—M. M. Lateef
Attorney, Agent, or Firm—Seidel, Gonda, Goldhammer & Abbott

[57] ABSTRACT

In electrical control apparatus having a first member disposed in an opening in a second member, the first and second members being adapted and arranged for relative movement with respect to each other, a safety device for covering the open portions of the opening as the first member moves relative to the opening. A primary shield is located adjacent to and overlaps the opening. The primary shield is operatively associated with the first member for movement in response to relative movement of the first member. The primary shield has a shape adapted to permit unrestrained movement of the first member while overlapping the open portions of the opening to cover those portions for all positions of the first member in the opening.

16 Claims, 8 Drawing Figures

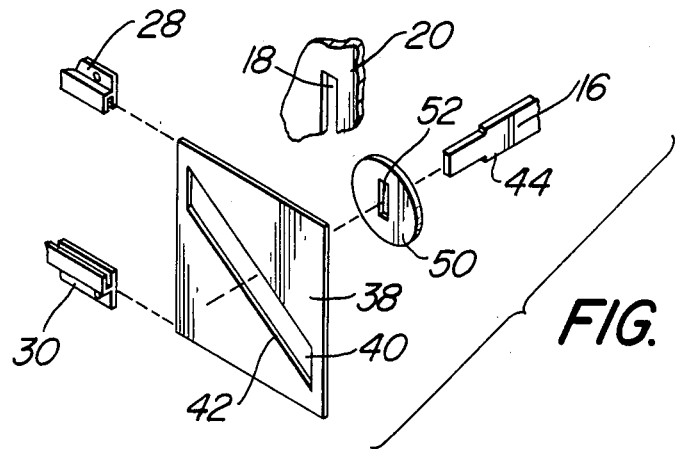
FIG. 5
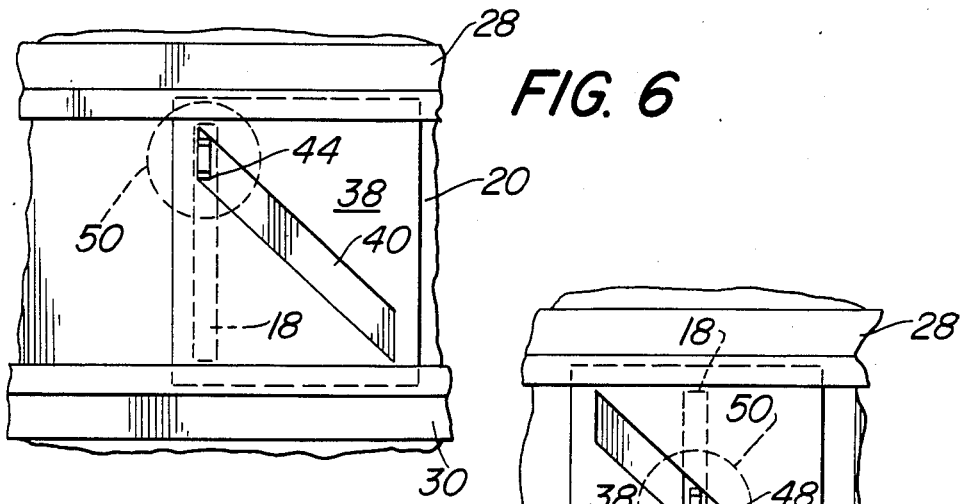
FIG. 6
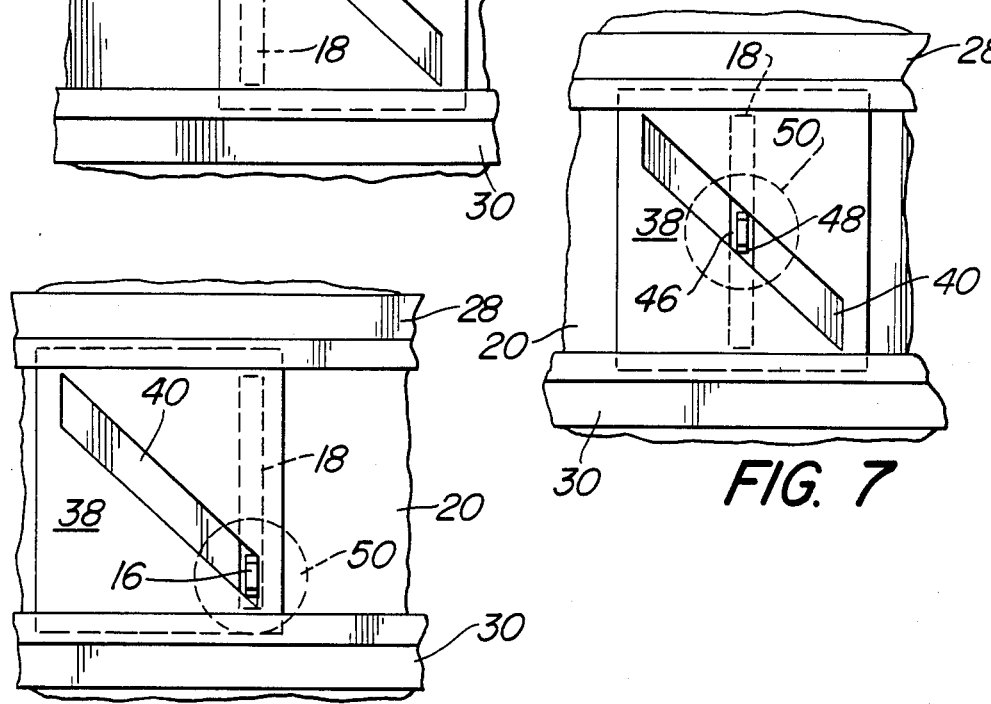
FIG. 7
FIG. 8

SAFETY DEVICE FOR APPARATUS HAVING RELATIVELY MOVABLE MEMBERS

BACKGROUND OF THE INVENTION

The present invention relates to a safety device for electrical control apparatus having a first member disposed in an opening in a second member, where the first and second members are adapted and arranged for relative movement with respect to each other, and in particular for a movable member which is reciprocably movable in a longitudinal direction in an opening in a stationary member. The invention is particularly suited for electrical control apparatus such as dimmer switches for controlling the intensity of lights of the type which utilize a linearly moving control member attached to a linear potentiometer. The control member typically projects through an elongated slot in an escutcheon plate.

In dimmer switches of this type, it is obviously necessary that the control member be permitted to move freely in the opening. This necessitates keeping the opening unobstructed. However, in many applications, there exists the danger that foreign objects can enter the open portions of the opening around the control member. For example, someone could inadvertently or deliberately insert a metallic object through the slot and contact live electrical components of the dimmer switch. Such an occurrence could result in serious injury to the person, as well as damage to the lighting system.

In fact, some standards agencies have long recognized this problem and have taken steps to prevent such occurrences. With respect to dimmer switches, British Standards Institution Specification No. BS5518:1977 requires that dimmer switches shall be constructed such that there are no free openings in their enclosures when they are fixed and wired as in normal use.

Previous attempts have been made to solve the problem of covering the open portions of the opening while allowing the control member unrestrained movement in the opening. One solution involves the use of a large sliding member coupled to the control element to cover the opening. An example of such a structure is shown in U.S. Pat. No. 3,746,923. There, a large rectangular opening is provided in the escutcheon plate and a slide member is inserted into the opening from behind the plate. The slide member has twice the area of the opening so that the opening is covered by the slide member at all times. The slide member is movable with the dimmer's linearly moving control member, and must be made at least twice as long as the rectangular opening to ensure that the opening is covered at all times, no matter what the position of the control member. Thus, a great deal of extra space above and below the opening is required.

Another solution involves the use of a continuous belt of flexible material wrapped around the housing of the dimmer switch to block the opening. A small hole is made in the belt to receive the control member. The belt is continuous and moves with the control member so that the slot is always covered no matter how the control member is moved.

The first solution requires a great deal of area, making dimmer switches which use that solution larger than they need to be. The second method requires the mechanism to be located on all sides of the dimmer switch. This can cause component layout and interference problems.

There is a need for a safety device which overcomes the disadvantages of previous safety devices. The present invention provides such a device. In addition, the present invention requires only a minimal amount of extra space above and below the opening, and enhances the "feel" of the dimmer switch mechanism employing the safety device of the invention.

SUMMARY OF THE INVENTION

The present invention is directed to a safety device for electrical control apparatus having a first member disposed in an opening in a second member, the first and second members being adapted and arranged for relative movement with respect to each other. The invention comprises means for covering the open portions of the opening as the first member moves relative to the opening, and includes primary shield means adjacent to and overlapping the opening, the primary shield means being operatively associated with the first member for movement in response to relative movement of the first member. The primary shield has a shape adapted to permit unrestrained relative movement of the first member while overlapping the open portions of the opening for all positions of the first member in the opening.

In a preferred embodiment of the invention, the primary shield means is movable in guide means at opposite ends of an opening in the form of a slot and which extend in a direction transverse to the slot. The primary shield means has a generally elongated opening through which the first member passes. The primary shield means is constrained by the guide means such that the opening extends obliquely across the slot from the first guide means to the second guide means. At least a portion of the first member is in contact with the periphery of the opening in the primary shield means as the first member moves relative to the slot for causing the primary shield means to move in a direction transverse to the slot.

The present invention is useful in dimmer switches which employ a linearly moving control member, and accordingly will be described in that context. However, it will be understood that the invention is useful in any electrical control application involving a first member relatively movable in an opening in another member, and is not limited to the disclosed embodiment.

DESCRIPTION OF THE DRAWINGS

FIG. 5 is an exploded view of a portion of the dimmer switch showing the safety device in greater detail.

FIGS. 6-8 illustrate the operation of a preferred embodiment of the safety device of the present invention.

Figure 1:
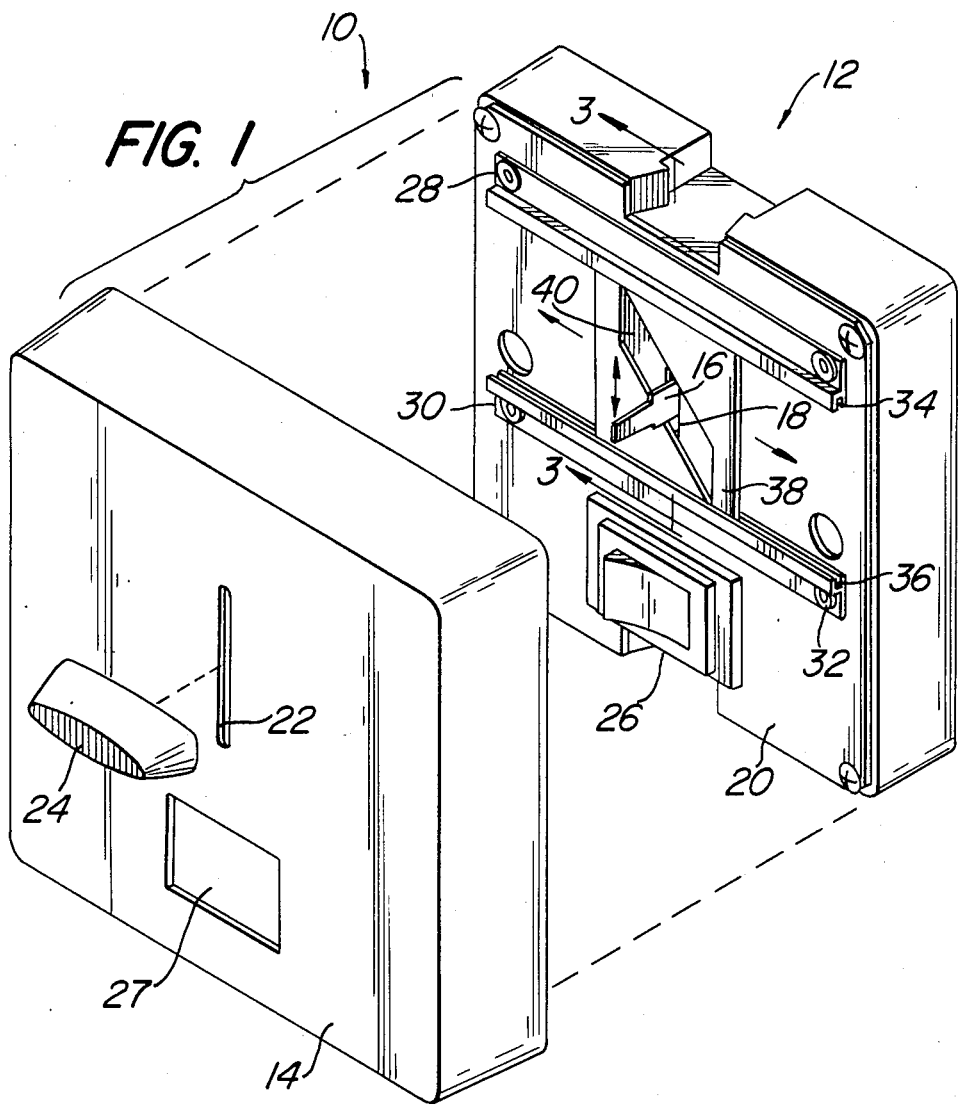
FIG. 1 is a partially-exploded view of a dimmer switch embodying the safety device of the present invention.
Figure 4:
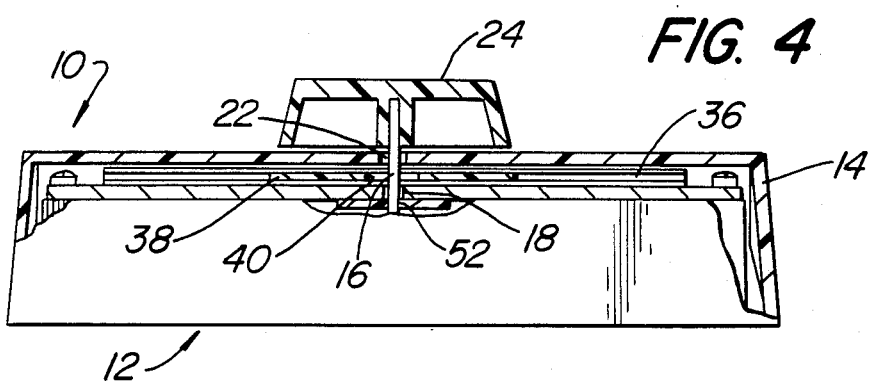
FIG. 4 is a sectional view taken along the lines 4—4 in FIG. 3.
Figure 2:
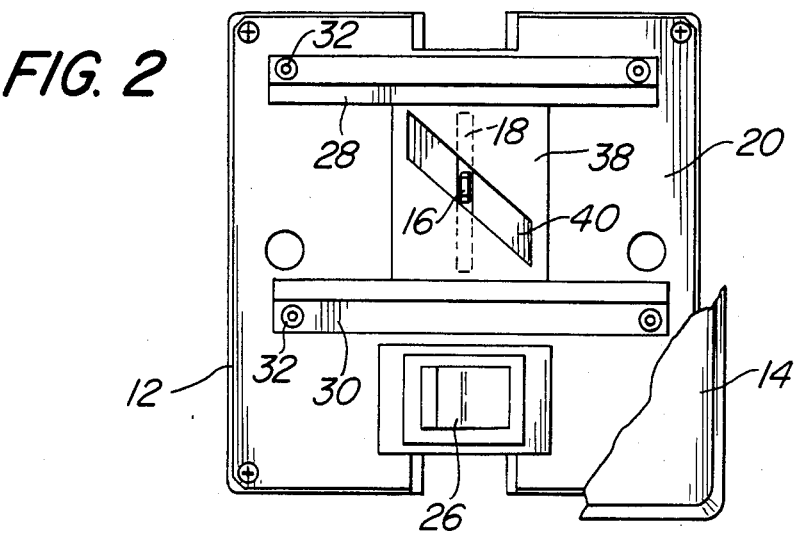
FIG. 2 is a front elevational view of the dimmer switch of FIG. 1, with the cover partially broken away.

For the purpose of illustrating the invention, there is shown in the drawings a form which is presently preferred; it being understood, however, that this invention is not limited to the precise arrangements and instrumentalities shown.

DESCRIPTION OF THE INVENTION

Referring now to the drawings, wherein like numerals indicate like elements, there is shown in FIG. 1 a dimmer switch 10 equipped with the safety feature of the present invention. The dimmer switch 10 comprises a housing 12 and an escutcheon plate 14. Escutcheon plate 14 may be removably fastened to housing 12 by any suitable means. The precise manner in which escutcheon plate 14 is attached to housing 12 is not crucial to the invention.

Within housing 12 is contained suitable light dimmer circuitry for connection in series with an electrical load for dimming lights or for other electrical control applications. The dimming circuitry includes an adjustable linear potentiometer (not shown) located within housing 12 and operated by a first linearly movable control member 16. Member 16 is reciprocably movable (in the direction shown by the double-headed arrow in FIG. 1) within an opening in the form of an elongated slot 18 in the front wall 20 of housing 12. Member 16 is thus movable relative to housing 12.

Member 16 extends through a corresponding slot 22 in escutcheon plate 14, and is also movable with respect to plate 14. Member 16 and plate 14 thus define relatively movable first and second members. Likewise, member 16 and wall 20 of housing 12 may also be thought of as relatively movable first and second members. A knob 24 is provided for manually operating member 16.

Located below member 16 and slot 18 is on-off switch 26. Swtich 26 may be a rocker switch, toggle switch, or other suitable on-off switch for applying power to the dimming circuitry in housing 12. An opening 27 is provided in escutcheon plate 14 in alignment with switch 26 to provide access to switch 26. Dimmer switch 10 may be provided with suitable terminals (not shown) for connection to a source of electrical power and to the lights to be dimmed.

Figure 3:
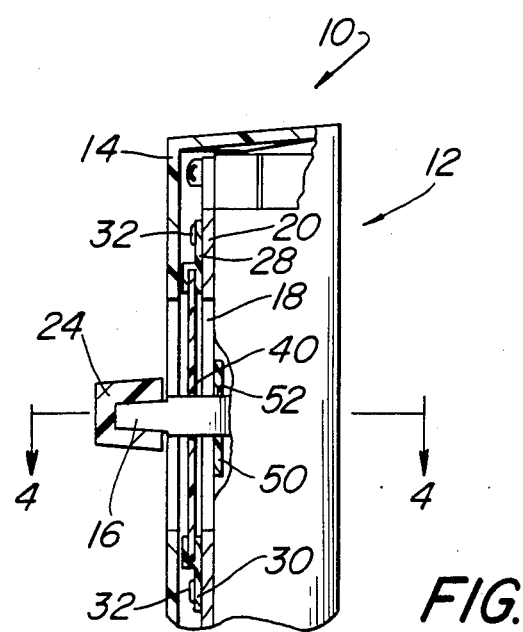
FIG. 3 is a sectional view taken along the lines 3—3 of FIG. 1.

A pair of guide rails 28 and 30 are located respectively above and below slot 18 on front wall 20 of housing 12. Guide rails 28 and 30 may be mounted on front wall 20 by any suitable means, such as by rivets 32. Alternately, guide rails 28 and 30 may be attached to the inside surface of escutcheon plate 14. As best seen in FIGS. 3 and 5, guide rails 28 and 30 have facing U-shaped channels 34 and 36, respectively. A primary shield means 38 is arranged for movement in channels 34 and 36 in a direction transverse to the long dimension of slot 18, as indicated by the single-headed arrows in FIG. 1.

Primary shield means 38 is located adjacent to and overlaps slot 18 and is movable in channels 34 and 36 in response to movement of member 16. Primary shield means 38 has an opening 40 which extends obliquely across slot 18 from guide rail 28 to guide rail 30. The inner periphery 42 of opening 40 is operatively associated with member 16 such that movement of member 16 causes it to exert a force on the inner periphery of opening 40. Because of the oblique angle of opening 40, a portion of this force will have a component in the transverse direction, sufficient to cause primary shield means 38 to move transversely as member 16 is moved longitudinally in slot 18. Primary shield means 38 is may be made of a thermoplastic or other suitable material to minimize friction between member 38 and member 16 and guide rails 28 and 30.

FIGS. 6–8 illustrate the way in which primary shield means 38 moves transversely in response to longitudinal movement of member 16. FIG. 6 illustrates member 16 in its extreme upper position. In that position, member 16 is at the upper left-hand corner of opening 40 in primary shield means 38. Downward movement of member 16 (only downward movement is possible from the position shown in FIG. 6) will cause cam surface 44 of member 16 to bear on the inner periphery 42 of opening 40. Downward movement of member 16 will thus cause primary shield means 38 to move to the left as viewed in FIGS. 6–8. FIG. 7 shows member 16 at approximately the mid-point of its longitudinal travel. At that point, primary shield means 38 has moved to the left with respect to slot 18. Continued downward movement of member 16 will cause primary shield means 38 to move to its extreme leftward position, as illustrated in FIG. 8. At that point, upward movement of member 16 will reverse the direction of movement of primary shield means 38 and cause it to move to the right as viewed in FIGS. 6–8.

As can be appreciated from FIGS. 6–8, the shape of primary shield means 38 enables it to substantially cover the open portions of the slot 18 as member 16 moves longitudinally in the slot. (By "open portions" is meant the portions of the slot other than the portion where member 16 happens to be located.) That is, for all positions of member 16 and slot 18, primary shield means 38 overlaps the open portions of slot 18.

It will also be apparent from FIGS. 6–8 that small areas 46 and 48 may in some cases not be overlapped by primary shield means 38. That is, there may be a small area of slot 18 through which an object can be inserted into the interior of housing 12. To prevent this and to fully cover the open portion of the slot in those cases, a secondary safety shield 50 is provided on member 16 behind front wall 20 of housing 12. Secondary safety shield 50 has an elongated opening 52 which has substantially the same cross-sectional area as the cross-section of member 16. This permits secondary safety shield 50 to fit snugly on member 16 and prevent objects from being inserted through the small open areas 46 and 48 into the interior of housing 12. Alternatively, secondary safety shield 50 can be formed integral with member 16. Secondary safety shield 50 may be circular, or may have any other suitable shape.

For aesthetic reasons, primary shield means 38, secondary safety shield 50 and escutcheon plate 14 may all be provided with the same surface finish or color.

The present invention may be embodied in other specific forms without departing from the spirit or essential attributes thereof and, accordingly, reference should be made to the appended claims, rather than to the foregoing specification, as indicating the scope of the invention.

We claim:

1. In electrical control apparatus having a first member disposed in an opening in a second member, the first and second members being adapted and arranged for relative movement with respect to each other, means for covering the open portions of the opening as the first member moves relative to the opening, comprising primary shield means adjacent to and overlapping the opening, the primary shield means being operatively associated with the first member for transverse movement relative to the opening in response to movement of the first member, the primary shield means having a shape adapted to permit unrestrained movement of the first member while substantially overlapping the open portions of the opening for all positions of the first member in the opening.

2. In apparatus according to claim 1, wherein the first member and the primary shield means are adapted and arranged for movement in mutually perpendicular directions.

3. In apparatus according to claim 1, wherein the primary shield means is disposed interiorly of the second member.

4. In apparatus according to claim 1, further comprising a secondary shield means operatively associated with the first member and moveable therewith, the secondary shield means being adapted and arranged to cover at least a portion of the opening for all positions of the first member in the opening.

5. In apparatus according to claim 4, wherein the primary shield means and secondary shield means cooperate to cover the entire opening for all positions of the first member in the opening.

6. In electrical control apparatus having a first member reciprocably movable in a longitudinal direction in an opening in a second member, means for covering the open portions of the opening as the movable member moves longitudinally in the opening, comprising primary shield means adjacent to and overlapping the opening and arranged for movement transverse to the opening in response to movement of the first member, the primary shield means being movable in first and second guide means at opposite ends of the opening and extending in a direction transverse to the opening, the primary shield means having a generally elongated opening through which the first member passes, the primary shield means being arranged with respect to the first and second guide means so that said opening extends obliquely across the opening in the second member from the first guide means to the second guide means, at least a portion of the first member being in contact with the periphery of the opening in the primary shield means as the first member moves in the opening for causing said transverse movement of the primary shield means, the primary shield means having a shape adapted to permit unrestrained movement of the first member while substantially overlapping the open portions of the opening in the second member for all positions of the movable member in said opening.

7. In apparatus according to claim 6, wherein the primary shield means is disposed interiorly of the second member.

8. In apparatus according to claim 6, further comprising a secondary shield means operatively associated with the first member and movable therewith, the secondary shield means being adapted and arranged to cover at least a portion of the opening in the second member for all positions of the first member in the opening.

9. In apparatus according to claim 8, wherein the primary shield means and secondary shield means cooperate to cover the entire opening for all positions of the first member in the opening.

10. A voltage control device comprising:
a housing,
circuit means in said housing for connection in series with an electrical load and for controlling the voltage to said load,
the circuit means including an adjustable resistor having a linearly movable control element extending outward from the housing through an elongated linear slot in a wall of the housing and arranged for movement along the long dimension of the slot,
first and second guide means on said housing wall located at opposite ends of the slot and extending in a direction perpendicular to the long dimension of the slot,
primary shield means overlapping the slot and movable in the guide means in a direction perpendicular to the long dimension of the slot, the primary shield means having an elongated opening therethrough which extends across the slot in the housing wall obliquely from the first guide rail to the second guide means,
the linearly movable control element extending through the opening through the primary shield means and being adapted and arranged to cause the primary shield means to move perpendicular to the long dimension of the slot in the housing wall as the control element is moved in said slot,
the primary shield means having a shape adapted to permit unrestrained movement of the control element while overlapping the open portions of the slot for all positions of the control element in the slot.

11. A voltage control device according to claim 10, wherein the primary shield means is disposed exteriorly of the housing.

12. A voltage control device according to claim 11, further comprising escutcheon plate means overlying the housing and the primary shield means, the escutcheon plate means having a slot therein substantially in alignment with and coextensive with the slot in the housing wall, said control element also extending through the slot in the escutcheon plate means.

13. A voltage control device according to claim 10, further comprising a secondary shield means operatively associated with the control element and movable therewith, the secondary shield means being adapted and arranged to cover at least a portion of the slot for all positions of the control element in the slot.

14. A voltage control device according to claim 13, wherein the primary shield means and secondary shield means cooperate to cover the entire slot for all positions of the control member in the slot.

15. A voltage control device according to claim 13, wherein the primary shield means and the secondary shield means have the same surface finish.

16. A voltage control device according to claim 12, wherein the primary shield means and the escutcheon plate means have the same surface finish.

* * * * *